United States Patent [19]

Iwasaki et al.

[11] Patent Number: 5,376,604
[45] Date of Patent: Dec. 27, 1994

[54] ORGANOPHILIC CLAY

[75] Inventors: Takashi Iwasaki, Tagajo; Hiromichi Hayashi, Sendai; Kazuo Torii, Sendai; Takahiro Sekimoto, Sendai; Toshikazu Fujisaki, Toyosaka; Motoyuki Ikegami, Yokosuka; Yutaro Ishida, Kawaguchi, all of Japan

[73] Assignees: CO-OP Chemical Co., Ltd.; Director General of The Agency of Industrial Science and Technology Shunso Ishihara, both of Tokyo, Japan

[21] Appl. No.: 909,640

[22] Filed: Jul. 7, 1992

[30] Foreign Application Priority Data

Jul. 11, 1991 [JP] Japan .................... 3-196071

[51] Int. Cl.$^5$ .............................. C04B 33/00
[52] U.S. Cl. ...................... 501/146; 252/315.2; 106/287.11; 106/DIG. 3; 106/DIG. 4
[58] Field of Search ............ 252/315.2; 501/146; 523/514; 106/287.1, 287.11, DIG. 3, DIG. 4

[56] References Cited

U.S. PATENT DOCUMENTS

| 4,105,578 | 8/1978 | Finlayson | 252/316 |
| 4,287,086 | 9/1981 | Finlayson | 252/316 |
| 4,664,820 | 5/1987 | Magauran et al. | 252/28 |
| 4,677,158 | 6/1987 | Tso et al. | 524/789 |
| 4,724,098 | 2/1988 | Kalz et al. | 252/315.2 |
| 4,742,098 | 5/1988 | Finlayson et al. | 523/514 |
| 5,075,033 | 12/1991 | Cody et al. | 252/315.2 |
| 5,130,028 | 7/1992 | Cody et al. | 210/691 |
| 5,190,693 | 3/1993 | Mattiou et al. | 252/313.1 |

FOREIGN PATENT DOCUMENTS

| 0133071 | 2/1985 | European Pat. Off. |
| 2547826 | 12/1984 | France |
| 2001063 | 1/1979 | United Kingdom |
| 2179336 | 3/1987 | United Kingdom |

Primary Examiner—Mark L. Bell
Assistant Examiner—A. Wright
Attorney, Agent, or Firm—Frishauf, Holtz, Goodman & Woodward

[57] ABSTRACT

There are disclosed an organophilic clay which comprises a hydroxypolyoxyethylenealkyl ammonium ion represented by the following formula:

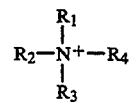

wherein $R_1$, $R_2$, $R_3$ and $R_4$ may be the same or different, and each represent a $(CH_2CH_2O)_nH$ group (where n is 2 or more, preferably 2 to 20), a hydrogen atom or an alkyl group having 1 to 30 carbon atoms, provided that one to three of $R_1$ to $R_4$ is/are a $(CH_2CH_2O)_nH$ group(s) and at least three of $R_1$ to $R_4$ are $(CH_2CH_2O)_nH$ group(s) and alkyl group(s), being introduced in interlayers of an expandable layer silicate, a method for preparing the same and a gellant for a high polar organic solvent.

41 Claims, No Drawings

ORGANOPHILIC CLAY

BACKGROUND OF THE INVENTION

This invention relates to an organophilic clay having functions of being dispersed in a high polar organic solvent and gelling the solvent, a method for preparing the same and a gelling rheological control agent.

Clay minerals are divided into a layer silicate mineral and an amorphous mineral, and the majority of which is occupied by the former. The layer silicate mineral has sheets in which $SiO_4$ tetrahedral sheets are arranged to a two-dimensional network structure. Among them, a 2:1 type layer silicate mineral has a laminated structure of several to several tens of silicate sheets having a three layered structure in which a magnesium octahedral sheet or an aluminum octahedral sheet is sandwiched between two sheets of silica tetrahedral sheets.

A sheet of an expandable layer silicate has a negative electric charge, and the electric charge is neutralized by the existence of alkali metal cations and/or alkaline earth metal cations in the interlayers, whereby the whole electric charges are balanced. Smectite or expandable mica which are the expandable layer silicate has a cation exchange ability and its interlayer is easily expandable. Also, it is dispersed in water to form a sol and has a particular property that it shows a thixotropic property by forming a gel when the concentration becomes high. By utilizing this characteristic thereof, the expandable layer silicate has been used for a component of drilling mud, a sand binder for casting, and a gellant for an aqueous system.

Further, the smectite type clay can be formed into a complex by the reaction with various cationic organic or inorganic compounds. As an example of such an organic complex, an organophilic clay in which a dimethyldioctadecyl ammonium ion, which is a quaternary ammonium ion, is introduced between sheets of a smectite by cation exchange has been industrially produced and used as a gellant of a coating. However, this complex has a drawback that an organic solvent which can be gelled by dispersing it is limited to a low polar solvent such as toluene and xylene. As a gellant of a polar solvent, there has been also known an organophilic clay in which a dimethylbenzyloctadecyl ammonium ion is introduced in interlayers of a smectite by cation exchange, but it has not exhibited a sufficient gelling effect for using in industrial processes as a gellant for a high polar organic solvent.

On the other hand, there has been also known a gellant for an organic solvent, to which an affinity is imparted by modifying the surface of fine silica with an organic substance, but it has drawbacks that if it is not used in a large amount, a gelling effect cannot be obtained, and the affinity to a solvent is low, so that when used for a long time, a part thereof is deposited and it becomes difficult to carry out redispersion.

The above existing gellants for an organic solvent have drawbacks that they hardly give a sufficient gelling effect when used with a high polar organic solvent such as alcohols, ketones, ethers, halogenated hydrocarbons and amides, and they cannot stand use for a long time. Thus, development of an organophilic clay which has a high affinity to a high polar organic solvent and can be used as a gellant stably for a long time has been demanded.

SUMMARY OF THE INVENTION

An object of the present invention is to provide an organophilic clay and a gellant for an organic solvent which can be dispersed for a long time in a high polar organic solvent, have a sufficient gelling effect on an organic solvent used in various industrial processes such as the productions of coatings, plastic products, films, and adhesives, and can give a good film-forming ability to a film after molding, e.g., in the preparation of a plastic film.

The present inventors have studied intensively for many years in order to develop an organophilic clay useful as a gellant of a high polar organic solvent, and consequently found that an organophilic clay in which a quaternary ammonium cation having a hydroxypolyoxyethylene group as a substituent is introduced in interlayers of an expandable layer silicate such as a smectite type clay or an expandable mica has an improved affinity between an expandable layer silicate and a high polar organic solvent such as alcohols, ethers, ketones, halogenated hydrocarbons and amides, and when dispersed in a high polar organic solvent exhibits a sufficient gelling effect. The present invention has been made according to this finding.

That is, the present invention is an organophilic clay which comprises a hydroxypolyoxyethylenealkyl ammonium ion or a hydroxypolyoxyethylene ammonium ion represented by the formula:

$$R_2-\underset{\underset{R_3}{|}}{\overset{\overset{R_1}{|}}{N^+}}-R_4 \qquad (I)$$

wherein $R_1$, $R_2$, $R_3$ and $R_4$ may be the same or different, and each represent a $(CH_2CH_2O)_nH$ group (where n is 2 or more, preferably 2 to 20), a hydrogen atom or an alkyl group having 1 to 30 carbon atoms, provided that one to three of $R_1$ to $R_4$ is/are a $(CH_2CH_2O)_nH$ group(s) and at least three of $R_1$ to $R_4$ are $(CH_2CH_2O)_nH$ group(s) and alkyl group(s), being introduced in interlayers of an expandable layer silicate, a method for preparing the same and a gellant for a high polar organic solvent, which comprises said organophilic clay.

DESCRIPTION OF THE PREFERRED EMBODIMENTS

The expandable layer silicate has a cation exchange ability and is a layer silicate showing a specific property that water is incorporated into the interlayers to expand, and there have been known, for example, a smectite type clay and an expandable mica. As the smectite type clay to be used in the present invention, there may be mentioned any one of a natural smectite type clay such as hectorire, saponite, stevensite, beidellite, montmorillonite, nontronite and bentonire, and a synthetic smectite type clay which is chemically synthesized, or substituted products, derivatives or mixtures of these. The expandable mica to be used in the present invention may be mentioned an expandable mica which is chemically synthesized, and for example, a synthetic expandable mica having Li ion or Na ion in the interlayers may be specifically mentioned.

The cation exchange capacity of the expandable layer silicate to be used for preparing the organophilic clay of the present invention is preferably 70 milli-equivalent or more, particularly desirably 85 to 130 milli-equivalent per 100 g of the clay.

The gellant for a high polar organic solvent comprising the organophilic clay of the present invention may contain 50% or less of non-clay impurities, but the amount of the non-clay impurities is desirably 10% or less.

The alkyl group in the hydroxypolyoxyethylenealkyl ammonium ion of the formula (I) has 1 to 30 carbon atoms, and may include, for example, methyl, ethyl, propyl, isopropyl, butyl, amyl, hexyl, heptyl, octyl, nonyl, decyl, undecyl, dodecyl, tridecyl, tetradecyl, pentadecyl and octadecyl, but the carbon number of at least one alkyl group is preferably 10 to 20 such as decyl, undecyl, dodecyl, tridecyl, tetradecyl, pentadecyl, octadecyl and eicosyl. n of the hydroxypolyoxyethylene group $(CH_2CH_2O)_nH$ is preferably 2 to 20, and larger number of n (addition condensation number) is preferred. Further, when a plural number of the hydroxypolyoxyethylene groups are substituted, the total oxyethylene units thereof are 2 to 50, preferably 10 or more, particularly 15 or more.

An organic cation to be used for preparing the product of the present invention is those having 2 to 20 (addition condensation number) hydroxypolyoxyethylene groups (n:2~20) of an oxyethylene unit, and there may be exemplified by monohydroxypolyoxyethylenetrialkylammonium chloride,
monohydroxypolyoxyethylenetrialkylammonium bromide,
monohydroxypolyoxyethylenedialkylammonium chloride,
monohydroxypolyoxyethylenedialkylammonium acetato,
dihydroxypolyoxyethylenedialkylammonium chloride,
dihydroxypolyoxyethylenedialkylammonium bromide,
dihydroxypolyoxyethylenealkylammonium chloride,
dihydroxypolyoxyethylenealkylammonium acetato,
trihydroxypolyoxyethylenealkylammonium chloride,
trihydroxypolyoxyethylenealkylammonium bromide,
trihydroxypolyoxyethyleneammonium chloride, and
trihydroxypolyoxyethyleneammonium acetato.

For introducing the quaternary ammonium ion (a hydroxypolyoxyethylene(alkyl) ammonium ion), a quaternary ammonium salt containing said cation is used. Such a salt is, for example, a salt of an anion such as $Cl^-$, $Br^-$, $NO_3^-$, $OH^-$ and $CH_3COO^-$, and the ammonium ion of the above formula (I).

Of these quaternary ammonium ions, preferred are those shown by the formulae (Ia) to (Ic):

$$R_1-\underset{\underset{R_2}{|}}{\overset{\overset{(CH_2CH_2O)_nH}{|}}{N^+}}-R_3 \qquad (Ia)$$

wherein $R_1$ represents a hydrogen atom or an alkyl group having 1 to 10 carbon atoms, $R_2$ represents an alkyl group having 1 to 25 carbon atoms and $R_3$ represents an alkyl group having 10 to 25 carbon atoms, and n is an integer of 5 to 30, $$R_1-\underset{\underset{(CH_2CH_2O)_mH}{|}}{\overset{\overset{(CH_2CH_2O)_nH}{|}}{N^+}}-R_2 \qquad (Ib)$$

wherein $R_1$ represents a hydrogen atom or an alkyl group having 1 to 10 carbon atoms, $R_2$ represents an alkyl group having 10 to 25 carbon atoms, and n and m are both integers of 2 or more and n+m=5 to 30, $$R_1-\underset{\underset{(CH_2CH_2O)_lH}{|}}{\overset{\overset{(CH_2CH_2O)_nH}{|}}{N^+}}-(CH_2CH_2O)_mH \qquad (Ic)$$

wherein $R_1$ represents a hydrogen atom or an alkyl group having 1 to 25 carbon atoms, and n, m and l are all integers of 2 or more and n+m+l=6 to 30.

The organophilic clay of the present invention can be obtained by ion-exchange reaction between an interlayer cation of the expandable layer silicate and a quaternary ammonium ion (a hydroxypolyoxyethylene(alkyl) ammonium ion).

The method for preparing the organophilic clay of the present invention is not particularly limited so long as it is a method in which a quaternary ammonium ion (a hydroxypolyoxyethylene(alkyl) ammonium ion) and an exchangeable cation of the clay can be ion-exchanged effectively. For example, it can be prepared by the following method.

The organophilic clay of the present invention can be prepared as described below. In the first step, an expandable layer silicate is dispersed in water. A solid concentration of the dispersion is generally desirably 1 to 15% by weight, but may be set without restraint so long as it is in the concentration range within which the expandable layer silicate can be dispersed sufficiently. In this case, a previously lyophilized expandable layer silicate is effectively used for preparing the organophilic clay easily. Next, by adding the above quaternary ammonium salt solution to this expandable layer silicate suspension, or alternatively adding the expandable layer silicate suspension to the above quaternary ammonium salt solution, the organophilic clay can be also prepared.

An amount of the quaternary ammonium salt to be added is desirably the amount equivalent to the cation exchange capacity of the expandable layer silicate, but it is possible to prepare the organophilic clay even by using an amount less than this amount. Further, it can be added in an amount exceeding the cation exchange capacity without any problem. The amount is preferably 0.5 to 1.5-fold (calculated on milli-equivalent), particularly 0.8 to 1.2-fold of the cation exchange capacity of said clay.

The reaction can proceed sufficiently at room temperature, but may be carried out under heating. The highest temperature of heating is determined by heat resistance of the quaternary ammonium salt to be used, and can be set as desired so long as it is a decomposition point of the salt or lower. Then, a solid and liquid are separated, and the organophilic clay formed is washed with water to remove by—produced electrolyte sufficiently. This organophilic clay is dried and, if necessary, pulverized to prepare a final product.

When the organophilic clay of the present invention is used as a gellant, the organophilic clay is added to an organic solvent and dispersed by stirring. So long as an amount of the clay is capable of being dispersed, a gelling effect is higher when the amount added is larger. The organic solvent having higher polarity, such as dimethylformamide, methanol and ethanol, can be made viscous more effectively.

The general characteristics of the novel organophilic clay obtained by practicing the present invention can be evaluated by selecting the following items depending on the purpose or carrying out them in combination.
(1) Chemical analysis
(2) X-ray powder diffraction (random orientation or pregerred orientation method)
(3) NMR (Nuclear Magnetic Resonance)
(4) Infrared absorption spectrum analysis
(5) Thermobalance and differential thermal analysis
(6) Rheometry of high polar organic solvent system
(7) Color tone
(8) Swellability in high polar organic solvent For example, formation of the organophilic clay of the present invention can be confirmed easily by measuring a position of 001 base reflection by X-ray diffraction. In the case of the smectite type clay used as a starting material, it has a basal spacing of 10 Å under a dehydrated state, and that of 12 to 16 Å under ordinary temperature and humidity, but the organophilic clay of the present invention has a basal spacing of 18Å or more although it depends on the carbon number of the alkyl group and the number of addition condensation of the hydroxypolyoxyethylene group in the quaternary ammonium ion in interlayers. Thus, it can be recognized that the organophilic clay is formed. Further, the function of the gellant can be confirmed easily by dispersing it in a high polar solvent such as an alcohol, and observing viscosity visually, and it can be also recognized by measuring rheological characteristics of the resulting dispersion by a viscometer.

It can be considered that the reason why the organophilic clay of the present invention has an affinity to a high polar organic solvent and further exhibits dispersing and gelling effects is that oxygen or a terminal proton of the hydroxypolyoxyethylene group is hydrogen-bonded with a proton or oxygen of the high polar organic solvent, and molecules of the solvent expand a space between the interlayer of the expandable layer silicate and further separate laminated silicate sheets. It is considered that the separated silicate sheets are mutually bonded irregularly due to a negative electric charge remaining on the sheet surface and a positive electric charge on the edge to form a gel structure.

While a conventional organophilic clay is used only for a low polar solvent, the organophilic clay of the present invention can be dispersed in high polar organic solvents such as alcohols, ketones, ethers, halogenated hydrocarbons and amides, or solvents containing them as a component, and used as a gellant. In the case of a clay-hydroxypolyoxyethylenealkyl ammonium ion complex, the organic solvent is preferably selected from alcohols, ketones, ethers and amides.

The organophilic clay of the present invention has an affinity to a high polar organic solvent, is easily dispersed therein, and exhibits an excellent gelling effect by addition of only a small amount, so that it is extremely useful since it can be used as a rheological control agent, a dispersant, an emulsifier and a binder, in various products and industrial processes such as cosmetics, pharmaceuticals, hygienic agents, adhesives, coatings, starting materials of dyes, various plastic products and the fiber industry, where rheological control of a high polar solvent is required. Further, this organophilic clay contains a hydroxypolyoxyethylene group, so that it is useful since it can be also used as an antistatic agent, a germicide, a dyeing aid, a level dyeing agent and a coupling agent, of fibers and plastics. Also, it is useful as a storing agent of an organic substance, a slow-releasing agent, a catalyst, a separating agent, an adsorbent, a resin stabilizer, a polymerization initiator, a carrier and a filler by utilizing a space between the sheets thereof.

EXAMPLE

Further, the present invention is described in detail by referring to Examples. Example 1

In 1000 ml of tap water was dispersed 20 g of a synthetic smectite having a composition of hectorire which is one kind of smectite, a basal spacing of 12.5 Å in air and a cation exchange capacity of 110 milliequivalent/100 g, and 300 ml of a solution in which 21.4 g of a product containing 95% of a quaternary ammonium salt represented by the following formula:

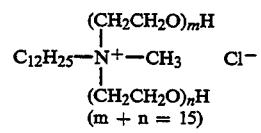

$$(m + n = 15)$$

was dissolved in tap water was added to the above synthetic smectite dispersion. The mixture was reacted at room temperature for 2 hours while stirring. The product was separated to a solid and a liquid and the solid was washed to remove by-produced salts, followed by drying and pulverization, to obtain a present product.

When the X-ray diffraction of the product was measured, the basal spacing calculated from its 001 reflection peak position was 21 Å, and formation of the organophilic clay of the present invention was confirmed. The present product was dispersed completely in N,N-dimethylformamide to form a transparent dispersion, and exhibited an affinity to a high polar organic solvent.

Example 2

The present product prepared in Example 1 was dispersed in ethanol with various concentrations. When the apparent viscosities at a shear rate 5.58 s$^{-1}$ were measured by using a rotational viscometer 6 rpm by using a Brookfield viscometer manufactured by Tokyo Keiki K. K., good gelling effects were exhibited. The results are shown in Table 1. The dispersions were clear white and had thixotropic property.

TABLE 1

| Apparent viscosity of the organophilic clay/ethanol system | |
|---|---|
| Dispersion concentration of present product (%) | Apparent viscosity at shear rate 5.58 s$^{-1}$ (mPa · s) |
| 0 | <1 |
| 2 | 22.5 |
| 4 | 520 |
| 6 | 2600 |
| 8 | 15000 |
| 10 | 33000 |

Example 3

The present product prepared in Example 1 was dispersed in methanol with various concentrations. When the apparent viscosities at a shear rate 5.58 s$^{-1}$ were measured by using the above rotational viscometer, extremely good gelling effects were exhibited as shown in Table 2. The dispersions were clear white and exhibited thixotropic property.

TABLE 2

| Apparent viscosity of the organophilic clay/methanol system | |
|---|---|
| Dispersion concentration of present product (%) | Apparent viscosity at shear rate 5.58 s$^{-1}$ (mPa · s) |
| 0 | <1 |
| 2 | 230 |
| 3 | 1400 |
| 4 | 2500 |
| 5 | 13000 |
| 6 | 23000 |

Example 4

The present product prepared in Example 1 was dispersed in N,N-dimethylformamide with various concentrations. When the apparent viscosities at a shear rate 5.58 s$^{-1}$ were measured in the same manner described above, extremely good gelling effects were exhibited as shown in Table 3. The dispersions were completely transparent and exhibited a thixotropic property.

TABLE 3

| Apparent viscosity of the organophilic clay/N,N-dimethylformamide system | |
|---|---|
| Dispersion concentration of present product (%) | Apparent viscosity at shear rate 5.58 s$^{-1}$ (mPa · s) |
| 0 | <1 |
| 3 | 15.8 |
| 4 | 32.5 |
| 5 | 2000 |
| 6 | 30000 |

Comparative Example 1

In the same manner as in Example 1 except for using 12.4 g of a dimethyldioctadecyl ammonium salt (trade name: available from Arquad 2HT, LION AKZO K.K.) in place of the quaternary ammonium salt of Example 1, an organophilic clay was prepared.

This organophilic clay was dispersed in ethanol and in methanol, but it was deposited. Thus, the apparent viscosity could not be measured. Also, the organophilic clay obtained was added to acetone and to methyl ethyl ketone, but it was not dispersed in either of them, and separated from the solvents and deposited. Thus, the apparent viscosity could not be measured.

Comparative Example 2

A complex of a natural hectorite and a dimethylbenzyloctadecyl ammonium ion (trade name: Bentone 27, available from N. L. Industries Incorporated) was tried to be dissolved in ethanol, but it was deposited and separated into two sheets. Thus, the apparent viscosity could not be measured.

Example 5

The organophilic clay was prepared in the same manner as in Example 1 except for using 20.9 g of 65% quaternary ammonium salt represented by the following formula:

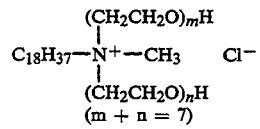

(m + n = 7)

in place of the quaternary ammonium salt used in Example 1. The resulting organophilic clay thus obtained was dispersed in N,N-dimethylformamide with various concentrations, and the apparent viscosities at a shear rate 5.58 s$^{-1}$ were measured by using the above rotational viscometer. The results are shown in Table 4.

TABLE 4

| Apparent viscosity of the organophilic clay/N,N-dimethylformamide system | |
|---|---|
| Dispersion concentration of present product (%) | Apparent viscosity at shear rate 5.58 s$^{-1}$ (mPa · s) |
| 0 | <1 |
| 4 | 3770 |
| 6 | 7800 |

As clearly seen from Table 4, the organophilic clays obtained exhibited extremely good gelling effects, and the dispersions were clear white and had a thixotropic property.

Example 6

The organophilic clay was prepared in the same manner as in Example 1 except for using 12.2 g of 100% quaternary ammonium salt represented by the following formula:

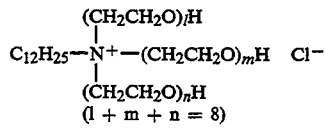

(l + m + n = 8)

in place of the quaternary ammonium salt used in Example 1. The resulting organophilic clay thus obtained was dispersed in N,N-dimethylformamide with various concentrations, and the apparent viscosities at a shear rate 5.58 s$^{-1}$ were measured by using the above rotational viscometer. The results are shown in Table 5.

TABLE 5

| Apparent viscosity of the organophilic clay/N,N-dimethylformamide system | |
|---|---|
| Dispersion concentration of present product (%) | Apparent viscosity at shear rate 5.58 s$^{-1}$ (mPa · s) |
| 0 | <1 |
| 2 | 110 |
| 4 | 9010 |

As clearly seen from Table 5, the organophilic clays obtained exhibited extremely good gelling effects, and the dispersions were completely transparent and had thixotropic property.

Example 7

The organophilic clay was prepared in the same manner as in Example 1 except for using 19.9 g of 100% quaternary ammonium salt represented by the following formula:

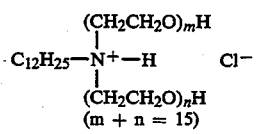

(m + n = 15)

in place of the quaternary ammonium salt used in Example 1. The resulting organophilic clay thus obtained was dispersed in N,N-dimethylformamide with various concentrations, and the apparent viscosities at a shear rate 5.58 s$^{-1}$ were measured by using the above rotational viscometer. The results are shown in Table 6.

TABLE 6

| Apparent viscosity of the organophilic clay/N,N-dimethylformamide system | |
|---|---|
| Dispersion concentration of present product (%) | Apparent viscosity at shear rate 5.58 s$^{-1}$ (mPa · s) |
| 0 | <1 |
| 2 | 140 |
| 4 | 9860 |

As clearly seen from Table 6, the organophilic clays obtained exhibited extremely good gelling effects, and the dispersions were clear white and had a thixotropic property.

Example 8

In the same manner as in Example 1 except for using 20.5 g of an expandable synthetic mica obtained by using a fine pulverized product of talc and sodium silicofluoride in place of the synthetic smectite and by heat treatment at 800° C., a present product was obtained.

The present product was completely dispersed in N,N-dimethylformamide to form a substantially transparent dispersion and exhibited affinity to a high polar organic solvent.

Example 9

The present product prepared in Example 8 was dispersed in ethanol with various concentrations. When the apparent viscosities at a shear rate 5.58 s$^{-1}$ were measured by using the above rotational viscometer at 6 rpm/min, extremely good gelling effects were exhibited as shown in Table 7. The dispersions were substantially transparent white and had a thixotropic property.

TABLE 7

| Apparent viscosity of the organophilic clay/ethanol system | |
|---|---|
| Dispersion concentration of present product (%) | Apparent viscosity at shear rate 5.58 s$^{-1}$ (mPa · s) |
| 0 | <1 |
| 5 | 30.5 |
| 10 | 730 |

Example 10

The present product prepared in Example 8 was dispersed in methanol with various concentrations. When the apparent viscosities at a shear rate 5.58 s$^{-1}$ were measured by using the above rotational viscometer at 6 rpm/min, extremely good gelling effects were exhibited as shown in Table 8. The dispersions were substantially transparent white and exhibited a thixotropic property.

TABLE 8

| Apparent viscosity of the organophilic clay/methanol system | |
|---|---|
| Dispersion concentration of present product (%) | Apparent viscosity at shear rate 5.58 s$^{-1}$ (mPa · s) |
| 0 | <1 |
| 5 | 210 |
| 10 | 1200 |

Example 11

The organophilic clay of the present invention obtained in Example 1 was dispersed in ethanol or N,N-dimethylformamide and respective dispersions were stored in a sealed vessel. After one year, no precipitation was formed in respective dispersions and thus stable gelling state was maintained.

In the organophilic clay and the gellant of the present invention, since organic molecules in interlayers have a high affinity to molecules of a solvent, the molecules of the solvent expand the interlayers and further separate laminated silicate sheets. Thus, while a gellant for an organic solvent, which comprises a conventional organophilic clay is used only for a low polar solvent, they exhibit sufficient dispersing action and gelling effect on a high polar organic solvent such as alcohols, ketones, ethers, halogenated hydrocarbons and amides, or solvents containing them as a component.

The gellant for an organic solvent of the present invention has an affinity to a high polar organic solvent, silicate sheets from which the organophilic clay is separated are mutually bonded due to a negative layer charge on the silicate surface and a positive charge on the edge to form gel, and the gellant is easily dispersed and exhibits an excellent gelling effect by addition of a small amount, so that it is extremely useful since it can be used as a rheological control agent in various products and industrial processes such as cosmetics, hygienic agents, coatings, adhesives, starting materials of dyes, various plastic products and the fiber industry, where rheological control of a high polar solvent is required.

We claim:

1. An organophilic clay which comprises (i) an expandable layered silicate which is dispersible in water and (ii) a hydroxypolyoxyethylenealkyl ammonium ion of the formula (I):

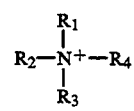

(I)

wherein R$_1$ is a hydrogen atom or an alkyl group having 1 to 30 carbon atoms, R$_2$ and R$_3$ are the same or different, and each represent a (CH$_2$CH$_2$O) group, where n is 2 or more, or an alkyl group having 1 to 30 carbon atoms and R$_4$ is a (CH$_2$CH$_2$O)$_n$H group, where n is 2 or more, the hydroxypolyoxyethylenealkyl ammonium ion being introduced in interlayers of the expandable layered silicate, said organophilic clay having an affinity to a high polar organic solvent.

2. The organophilic clay according to claim 1, wherein the hydroxypolyoxyethylenealkyl ammonium ion is at least one selected from the group consisting of:
monohydroxypolyoxyethylenetrialkylammonium ion,
monohydroxypolyoxyethylenedialkylammonium ion, dihydroxypolyoxyethylenedialkylammonium ion,
dihydroxypolyoxyethylenealkylammonium ion,
trihydroxypolyoxyethylenealkylammonium ion, and
trihydroxypolyoxyethyleneammonium ion,
and n in the formula (I) is 2 to 20.

3. The organophilic clay according to claim 1, wherein said alkyl group has 10 to 20 carbon atoms.

4. The organophilic clay according to claim 1, wherein number of total oxyethylene unit (CH$_2$CH$_2$O) is 2 to 50.

5. The organophilic clay according to claim wherein the hydroxypolyoxyethylenealkyl ammonium ion is at least one selected from the group consisting of:

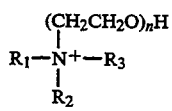
(Ia)

wherein R$_1$ represents a hydrogen atom or an alkyl group having 1 to 10 carbon atoms, R$_2$ represents an alkyl group having 1 to 25 carbon atoms and R$_3$ represents an alkyl group having 10 to 25 carbon atoms, and n is an integer of 5 to 30,

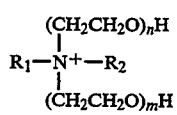
(Ib)

wherein R$_1$ represents a hydrogen atom or an alkyl group having 1 to 10 carbon atoms, R$_2$ represents an alkyl group having 10 to 25 carbon atoms, and n and m are both integers of 2 or more and n+m=5 to 30, and

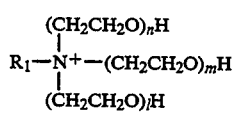
(Ic)

wherein R$_1$ represents a hydrogen atom or an alkyl group having 1 to 25 carbon atoms, and n, m and l are all integers of 2 or more and n+m+l=6 to 30.

6. The organophilic clay according to claim 1, wherein the expandable layered silicate is a smectite clay which has a cation exchange capacity of 85 to 130 milli-equivalents per 100 g of the clay.

7. The organophilic clay according to claim 1, wherein the hydroxypolyoxyethylenealkyl ammonium ion is in an amount of 0.5 to 1.5-fold of the amount calculated on a milli-equivalent basis of the cation exchange capacity of the clay.

8. The organophilic clay according to claim 1, wherein the organophilic clay has a basal spacing of 18 Å or more.

9. The organophilic clay according to claim 1, wherein said expandable layer silicate is a chemical synthesized hectorite clay or an expandable mica.

10. A method of gelling a high polar organic solvent, which comprises contacting the high polar organic solvent with the organophilic clay as claimed in claim 1.

11. The method according to claim 10, wherein the hydroxypolyoxyethylenealkyl ammonium ion is at least one selected from the group consisting of:
monohydroxypolyoxyethylenetrialkylammonium ion,
monohydroxypolyoxyethylenedialkylammonium ion,
dihydroxypolyoxyethylenedialkylammonium ion,
dihydroxypolyoxyethylenealkylammonium ion,
trihydroxypolyoxyethylenealkylammonium ion, and
trihydroxypolyoxyethyleneammonium ion,
and n in the formula (I) is 2 to 20.

12. The method according to claim 11, wherein said alkyl group has 10 to 20 carbon atoms.

13. The method according to claim 10, wherein n is 2 to 50.

14. The method according to claim 11, wherein the hydroxpoloxythylenealkyl ammonium ion is at least one selected from the group consisting of:

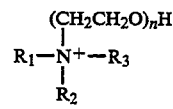
(Ia)

wherein R$_1$ represents a hydrogen atom or an alkyl group having 1 to 10 carbon atoms, R$_2$ represents an alkyl group having 1 to 25 carbon atoms and R$_3$ represents an alkyl group having 10 to 25 carbon atoms, and n is an integer of 5 to 30,

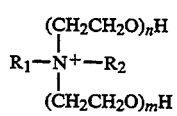
(Ib)

wherein R$_1$ represents a hydrogen atom or an alkyl group having 1 to 10 carbon atoms, R$_2$ represents an alkyl group having 10 to 25 carbon atoms, and n and m are both integers of 2 or more and n+m=5 to 30, and

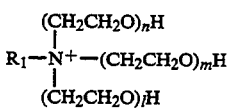
(Ic)

wherein R$_1$ represents a hydrogen atom or an alkyl group having 1 to 25 carbon atoms, and n, m and l are all integers of 2 or more and n+m+l=6 to 30.

15. The method according to claim 10, wherein said expandable layer silicate is a chemically synthesized hectorite clay or a chemically synthesized expandable mica.

16. The organophilic clay according to claim 2, wherein n is 2 to 20; the expandable layered silicate is a chemically synthesized hectorite; the hydroxypolyoxyethylenealkyl ammonium ion is in an amount of 0.5 to 1.5-fold of the amount calculated on a milli-equivalent basis of the cation exchange capacity of the clay; and the organophilic clay having a basal spacing of 18 Å or more.

17. The organophilic clay according to claim 2, wherein n is 2 to 20; the expandable layered silicate is a chemically synthesized expandable mica having Li ions or Na ions and having a cation exchange capacity of 85 to 130 milli-equivalents per 100 g of the clay; the hydroxypolyethylenealkyl ammonium ion is in an amount of 0.5 to 1.5-fold of the amount calculated on a milli-equivalent basis of the cation exchange capacity of the clay; and the organophilic clay having a basal spacing of 18 Å or more.

18. The method according to claim 11, wherein the high polar organic solvent is selected from the group consisting of alcohols, ketones, ethers, halogenated hydrocarbons and amides.

19. The method according to claim 18, wherein the gellant contains 50% or less of non-clay impurities.

20. A gellant having an affinity to a high polar organic solvent, which comprises 50% or more of the organophilic clay according to claim 1 and the remainder being non-clay impurities.

21. The gellant of claim 21, which comprises 90% or more of the organophilic clay and the remainder being non-clay impurities.

22. The gellant of claim 21, wherein the gellant is in an amount of 2 to 10% by weight based on the total amount of the gellant and a high polar organic solvent.

23. The gellant of claim 22, wherein the hydroxypolyoxyethylenealkyl ammonium of the organophilic clay according to claim 1 is at least one selected from the group consisting of:
monohydroxypolyoxyethylenetrialkylammonium ion,
monohydroxypolyoxyethylenedialkylammonium ion,
dihydroxypolyoxyethylenedialkylammonium ion,
dihydroxypolyoxyethylenealkylammonium ion,
trihydroxypolyoxyethylenealkylammonium ion, and
trihydroxypolyoxyethyleneammonium ion,
and n in the formula (I) is 2 to 20.

24. The gellant of claim 23, wherein said alkyl group has 10 to 20 carbon atoms.

25. The gellant of claim 24, wherein the number of total oxyethylene units ($CH_2CH_2O$) is 2 to 50.

26. The gellant of claim 25, wherein the hydroxypolyoxyethylenealkyl ammonium ion is at least one selected from the group consisting of:

(Ia)

wherein $R_1$ represents a hydrogen atom or an alkyl group having 1 to 10 carbon atoms, $R_2$ represents an alkyl group having 1 to 25 carbon atoms and $R_3$ represents an alkyl group having 10 to 25 carbon atoms, and n is an integer of 5 to 30,

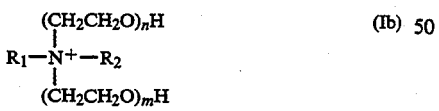
(Ib)

wherein $R_1$ represents a hydrogen atom or an alkyl group having 1 to 10 carbon atoms, $R_2$ represents an alkyl group having 10 to 25 carbon atoms, and n and m are both integers of 2 or more and n+m=5 to 30, and

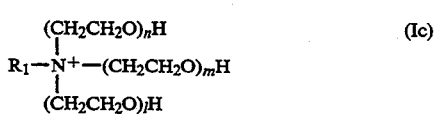
(Ic)

wherein $R_1$ represents a hydrogen atom or an alkyl group having 1 to 25 carbon atoms, and n, m and l are all integers of 2 or more and n+m+l=6 to 30.

27. The gellant of claim 26, wherein the hydroxypolyoxyethylenealkyl ammonium ion is at least one selected from the group consisting of:

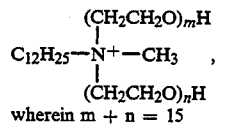
wherein m + n = 15

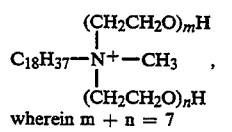
wherein m + n = 7

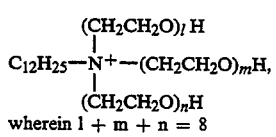
wherein l + m + n = 8 and

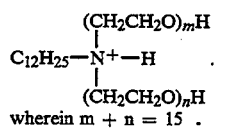
wherein m + n = 15.

28. The gellant of claim 27, wherein said expandable layer silicate has a cation exchange capacity of 70 to 130 milli-equivalent per 100 g of the clay.

29. The gellant of claim 28, wherein the hydroxypolyoxyethylenealkyl ammonium ion is in an amount of 0.5 to 1.5-fold calculated on milli-equivalents of the cation exchange capacity of the clay.

30. The gellant of claim 29, wherein a basal spacing of the clay-organic complex is 18 Å or more.

31. The gellant of claim 30, wherein said expandable layer silicate is a chemically synthesized hectorite or a chemically synthesized expandable mica.

32. The gellant of claim 31, wherein the high polar organic solvent is methanol, ethanol or N,N-dimethylformamide.

33. The gellant of claim 32, wherein the chemically synthesized expandable mica is prepared by heating a fine pulverized product of talc and sodium silicofluoride at 800° C.

34. The organophilic clay according to claim 1, wherein said high polar organic solvent is selected from the group consisting of methanol, ethanol and N-,N-dimethylformamide.

35. The method according to claim 11, wherein said high polar organic solvent is selected from the group consisting of methanol, ethanol and N,N-dimethylformamide.

36. A gellant having an affinity to a high polar organic solvent, which comprises 2 to 10% by weight of the organophilic clay according to claim 1 and the remainder being the high polar organic solvent.

37. The gellant according to claim 36, wherein the expandable layer silicate is a chemically synthesized hectorite or a chemically synthesized expandable mica.

38. The gellant according to claim 37, wherein said high polar organic solvent is selected from the group consisting of methanol, ethanol and N, N-dimethylformamide.

39. The organophilic clay according to claim 1, wherein $R_1$ is hydrogen.

40. The organophilic clay according to claim 1, wherein $R^2$ and $R^3$ are both the same or different and are an alkyl group having 1 to 30 carbon atoms.

41. The organophilic clay according to claim 40, wherein $R_1$ is hydrogen.

* * * * *